United States Patent [19]

Shimizu

[11] Patent Number: 5,452,296
[45] Date of Patent: Sep. 19, 1995

[54] ASYNCHRONOUS TRANSFER MODE COMMUNICATION SYSTEM

[75] Inventor: Hiroshi Shimizu, Tokyo, Japan

[73] Assignee: NEC Corporation, Japan

[21] Appl. No.: 151,794

[22] Filed: Nov. 12, 1993

[30] Foreign Application Priority Data

Nov. 12, 1992 [JP] Japan .................................. 4-327235

[51] Int. Cl.[6] .............................................. H04J 3/02
[52] U.S. Cl. ...................................... 370/60.1; 370/60
[58] Field of Search ...................... 370/60, 60.1, 94.1, 370/93, 92, 91, 58.1, 58.2, 58.3, 54, 17

[56] References Cited

U.S. PATENT DOCUMENTS 5,067,123  11/1991  Hyodo et al. ......................... 370/60

OTHER PUBLICATIONS

CCITT. Study Group XI/Working Party XI/6 Qetion: 20/XI, 22–26 Jun. 1992.

Primary Examiner—Douglas W. Olms
Assistant Examiner—Huy D. Vu
Attorney, Agent, or Firm—Ostrolenk, Faber, Gerb & Soffen

[57] ABSTRACT

An ATM communication system capable of minimizing the delay period and achieving high throughput without requiring setting of the corresponding virtual connection (VC) table and routing. The communication system includes a vacant virtual connection table indicating unused VC. The VC is retrieved in response to a transmission demand and set in an ATM cell as a virtual connection ID (VCI). Then, the cell is transmitted with added address information identifying the destination. An ATM switch and a routing controller determine routing from a transmitting terminal to a receiving terminal. The determined routing is stored in a routing table in the routing controller. Then, through the determined routing, data is transferred from the transmitting terminal to the receiving terminal.

7 Claims, 8 Drawing Sheets

FIG.2 (a)

| VCI |
|---|
| 2 |
| 3 |
|  |

11

| VCI | IP ADDRESS |
|---|---|
| 1 | 1 1 0 |
| 5 | 0 1 3 |
|  |  |

12

⇩  ⇩

| VCI |
|---|
| 3 |
|  |
|  |
|  |

| VCI | IP ADDRESS |
|---|---|
| 1 | 1 1 0 |
| 5 | 0 1 3 |
| 2 | 1 2 3 |
|  |  |

FIG.2 (b)

| VCI | IP ADDRESS |
|---|---|
| 3 | 1 0 1 |
| 2 | 2 1 1 |
|  |  |

41

⇩

| VCI | IP ADDRESS |
|---|---|
| 3 | 1 0 1 |
| 2 | 2 1 1 |
| 1 | 2 1 0 |
|  |  |

FIG.2 (c)

| IN | | OUT | |
|---|---|---|---|
| PN | VCI | PN | VCI |
| 1 | 4 | 3 | 2 |
| 3 | 1 | 1 | 6 |
|  |  |  |  |
|  |  |  |  |

31

⇒

| IN | | OUT | |
|---|---|---|---|
| PN | VCI | PN | VCI |
| 1 | 4 | 3 | 2 |
| 3 | 1 | 1 | 6 |
| 2 | 2 | 4 | 1 |
|  |  |  |  |

ASYNCHRONOUS TRANSFER MODE
COMMUNICATION SYSTEM

BACKGROUND OF THE INVENTION

1. Field of the Invention setting of virtual connection (VC) in an asynchronous transfer mode (ATM) communication system. More specifically, the invention relates to a VC setting system for a local area network (LAN) communication.

2. Description of the Related Art

An ATM communication system employing a fixed length cell as a transfer unit has an excellent characteristics permitting uniting point-to-multipoint communications and multi-media communications. Therefore, in recent years, the ATM communication system is attracting attention in the application for LAN communication. Here, in burst communication, original information, i.e. service data unit (variable length) is transmitted by dividing into fixed length cells including 5 octets of header and 48 octets of payload, as shown in FIG. 8. Routing in the ATM system is performed using a virtual connection ID (VCI) in the header.

In an ATM communication system, there are two VC setting systems, i.e. a method for setting the VC employing a dedicated VC for signaling setting and a permanent virtual connection (PVC) for semi-permanently setting the VC.

The former method employs a similar method to call setting in an integrated service digital network (ISDN), namely, C (control)-plane and U (User)-plane are set separately and the call in U-plane communication is set by C-plane, which method is referred to as "outband signaling".

On the other hand, the later method does not employ C-plane, in which routes for all distant users are preliminarily established for selecting VC depending upon the distant user to call.

The PVC method has been disclosed in Japanese Unexamined Patent Publications Nos. 2-234538, 1-144745, 1-126043, 2-239749, 2-284543 and 3-97334.

In the former method employing outband signaling, the following drawback can be encountered. Namely, the communication in C-plane is a communication not with the distant user but with a call control portion. In case of communication between users with small data amount, the data amount to be handled by U-plane becomes substantially equal to the data amount to be handled by C-plane to cause large overhead resulting in increasing of the delay period and degradation of throughput.

On the other band, in the later technology, namely the method to preliminarily set routes for all distant users, a defect is encountered in the limitation of capacity for setting depending upon bit length of VC. For instance, in case of 16 bits VC, the maximum number of routes is limited at approximately 64000.

In addition, the later PVC method has a shortcoming that a routing table for defining correspondence between VCI and address information has to be preliminarily prepared upon establishing the system. Furthermore, preparation of the routing table requires complicated operation and possibly causes error.

SUMMARY OF THE INVENTION

The present invention is to resolve the defects and drawbacks in the prior art as set forth above. Therefore, it is an object of the present invention to provide an ATM communication system which permits high speed communication and has high flexibility and expandability.

Another object of the invention is to provide an ATM communication system which can reduce required operation in establishing the system.

In order to accomplish the above-mentioned and other objects, a communication system performing an asynchronous transfer mode communication employing a fixed length cell, comprises:

a vacant virtual connection table indicating a value of unused virtual connection;

retrieving means for retrieving the value of the unused virtual connection from the vacant virtual connectiontable in response to a transmission demand; and transmitting means for setting the retrieved value of the virtual connection as a virtual connection identification of the cell and performing transmission with adding address information specifying destination to the cell.

The communication system may further comprise:

a switching system including means for determining routing from the transmitting means to the destination on the basis of the address information and a routing table for storing the determined routing; and receiving means for receiving data from the transmitting means through the routing determined by the switching system.

BRIEF DESCRIPTION OF THE DRAWINGS

The present invention will be understood more fully from the detailed description given herebelow and from the accompanying drawings of the preferred embodiment of the invention, which, however, should not be taken to be limiting of the invention but are for explanation and understanding only.

In the drawings:

FIGS. 2(a)~2(c) are conceptual diagrammatic illustrations showing examples of registration of a vacant VCI table 11, a VCI-IP address table 12, a routing table 31 and VCI-IP address table 41;

DESCRIPTION OF THE PREFERRED EMBODIMENT

Figure 1:
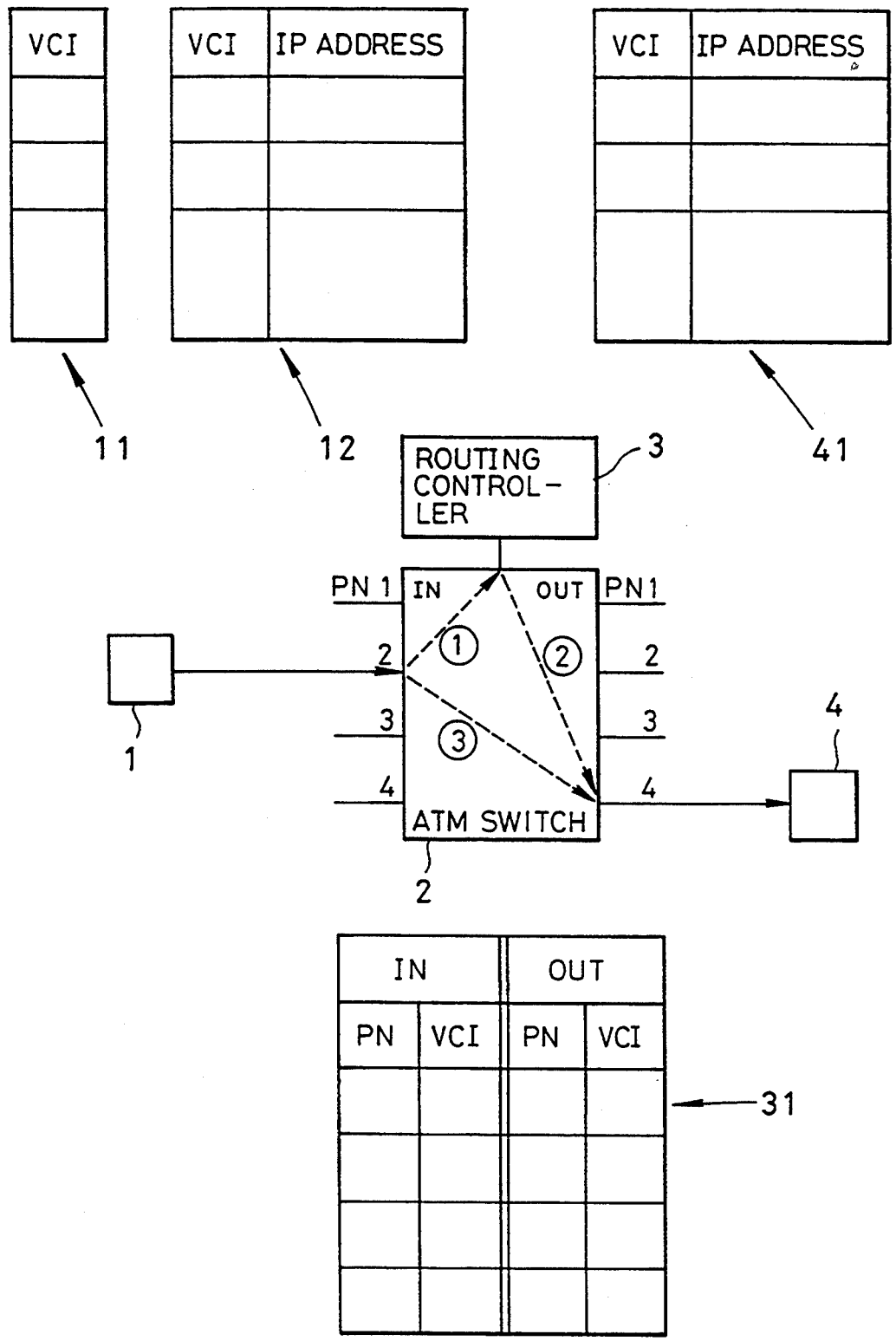
FIG. 1 is a block diagram showing the construction of the preferred embodiment of an ATM communication system according to the present invention.

The preferred embodiment of the present invention will be discussed hereinafter with reference to the accompanying drawings. FIG. 1 is a block diagram showing a construction of one embodiment of an ATM communication system in accordance with the present invention. The shown embodiment of the ATM communication system includes an ATM switching system (ATM system) comprising a transmitting terminal 1 as a transmitting device, an ATM switch 2 and a routing controller 3, and a receiving terminal 4 as a receiver device.

In the shown embodiment, the ATM switch 2 has four ports PN1~PN4 at an input port side (IN side) and four ports PN1~PN4 at an output port side (OUT side). The ATM switch 2 is controlled by the routing controller 3 for establishing routing connection between respective inlet ports and outlet ports.

It should be appreciated that other transmitting terminals and receiving terminals other than the transmitting terminal 1 and the receiving terminal 4, are connected to respective ports of the ATM switch 2. In the transmitting terminal 1, a vacant VCI table 11, and a VCI-IP (internet protocol) address table 12 are provided. On the other hand, in the receiving terminal 4, a VCI-IP address table 41 is provided. Also, in the routing controller 3, a routing table 31 is provided. Detailed discussion will be given later.

In the shown embodiment, the following discussion will be given in connection with a communication from the transmitting terminal 1 connected to the port PN2 at the input port side to the receiver terminal 43 connected to the port PN4 at the output port side.

Figure 5A:
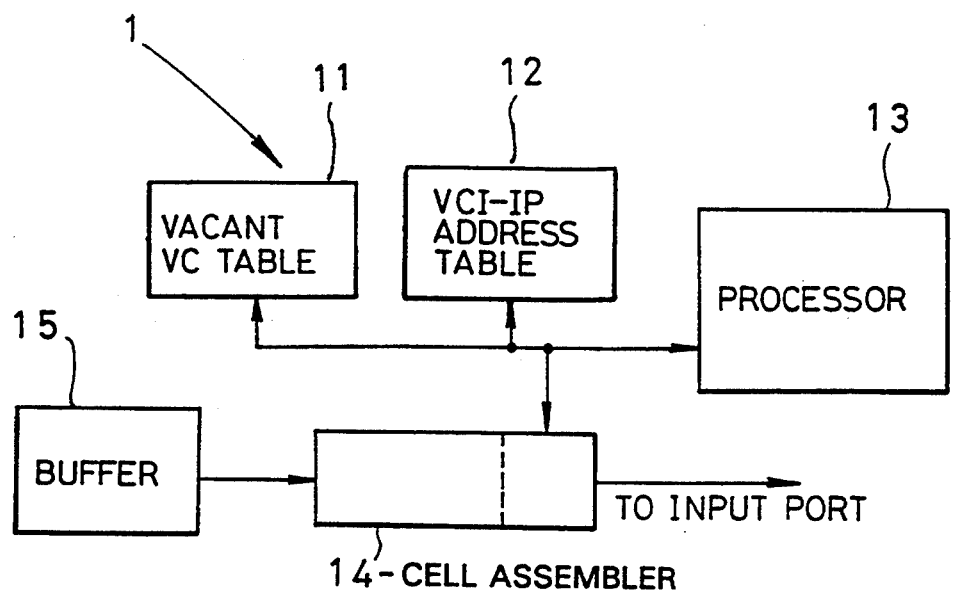
FIGS. 5(a) and 5(b) are block diagrams respectively showing constructions of a transmitting terminal and a receiving terminal in FIG. 1.

At first, the internal structures of respective components in FIG. 1 will be discussed. Initially, the internal structures and operations of the transmitting terminal 1 and the receiving terminal 4 are discussed with reference to FIGS. 5(a) and 5(b). FIG. 5(a) is a block diagram showing an example of the internal structure of the transmitting terminal 1, in which the transmitting terminal 1 includes a buffer 15 for temporarily storing data to be transmitted, i.e. a service data unit (SDU), a cell assembling means 14 for dividing the data stored in the buffer 15 and assembling fixed length cells. The transmitting terminal 1 further includes a processor 13 for adding VCI or AD for the header portions of respective cells after assembling the cells, the vacant VCI table 11 indicating VCs currently not used, and the VCI-IP address table 12 indicating correspondence between the currently used VC and the IP address of distant user on communication.

With the construction set forth above, the service data unit stored in the buffer 15 is supplied to the cell assembling means 14 and thus divided into the fixed length cells. Then, the processor 13 reads out the IP address and sets an identification bit AD of the cell containing the read out IP address. Also, the processor 13 makes reference to the VCI-IP address table 12 on the basis of the read out IP address of the distant terminal to make a call. When the IP address has already been registered in the table 12, the corresponding VCI is written in the headers of respective cells. On the other hand, if the IP address is not registered, a vacant VC, i.e. the VC which is not currently used, is selected from the vacant VCI table 11 to register in the VCI-IP table 12. Thereafter, the VCI is written in the headers of respective cells. Each cell is supplied to the input port of the ATM switch in order.

Here, in the foregoing operation, further discussion will be given for variation of content of registration of the vacant VCI table 11 and the VCI-IP address table 12 when the read out IP address has not been registered in the VCI-IP address table 12. FIG. 2(a) is a conceptual diagrammatic illustration showing an example of variation of the content of registration of the vacant VCI table 11 and the VCI-IP address table 12.

In FIG. 2(a), "2" and "3" are registered in the upper side vacant VCI table 11, and correspondence between VCI "1" and IP address "110" and correspondence between VCI "5" and IP address "013" are registered in the VCI-IP address table 12. When the processor 13 makes reference to the vacant VCI table 11, the VCI "2" which is currently not used can be selected. Then, the VCI "2" can be corresponded to an IP address "123" of the distant receiver terminal 4 and registered in the VCI-IP address table 12.

The lower side of FIG. 2(a) shows the vacant VCI table 11 and the VCI-IP address table 12 after modification. As can be seen, the correspondence between VCI "2" and the IP address "123" is registered. By this, the VCI "2" becomes occupied state and thus eliminated from the vacant VCI table 11. Therefore, in the vacant VCI table 11, only VCI "3" remains.

Figure 5B:
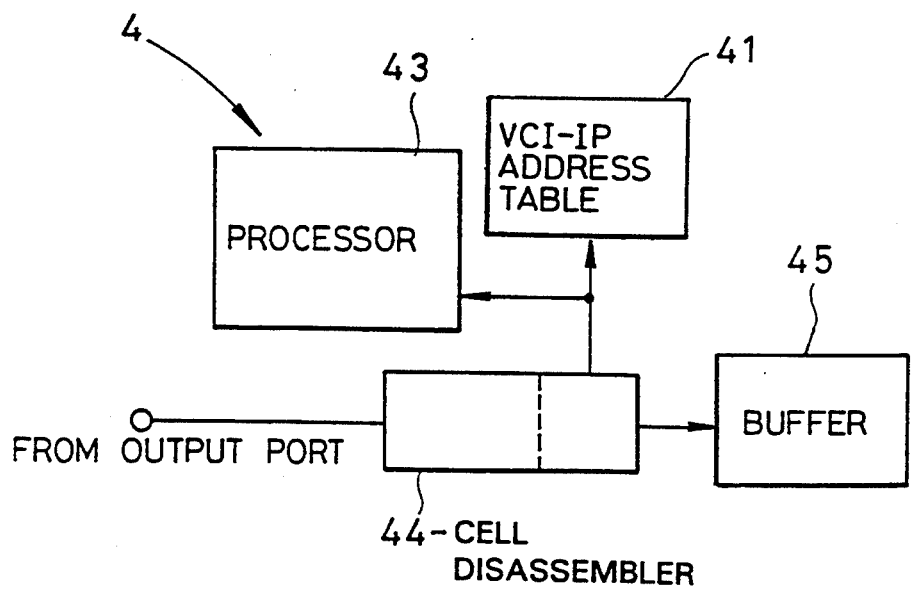

On the other hand, FIG. 5(b) shows the internal structure of the receiving terminal 4. In FIG. 5(b), the receiving terminal 4 includes a cell disassembling means 44 for disassembling the cells and restoring the service data unit, a buffer 45, the VCI-IP address table 41 indicating the correspondence between the received IP address of the transmission side terminal and the VCI, and a processor 43 for performing the writing process for the table 41.

In the construction set forth above, the cells supplied from the output port of the ATM switch are input to the cell disassembling means 44. Then, the payload portion of respective cells are fed to the buffer 45 in order and accumulated therein. By this, the original service data unit can be restored by interconnecting the payloads accumulated in the buffer 45. In conjunction therewith, the processor 43 reads out the IP address from the cell and writes the correspondence between the read out IP address and the VCI in the VCI-IP address table 41 for registration.

When the read out IP address has not been registered in the VCI-IP address table 41, the VCI-IP address table 41 is updated in the manner as illustratively discussed hereinafter. FIG. 2(b) is a conceptual illustration showing an example of variation of the content of registration in the VCI-IP address table 41.

In the upper side VCI-IP address table 41 in FIG. 2(b), the correspondence between VCI "3" and the IP address "101", and the correspondence between VCI "2" and the IP address "211" are stored. Here, by communication from the transmitting terminal via the ATM switch, new correspondence between the VCI and the IP address is registered in the VCI-I address table 41. The lower table in FIG. 2(b) shows addition of the correspondence between VCI "1" and the IP address "210" of the transmitting terminal 1.

Figure 6:
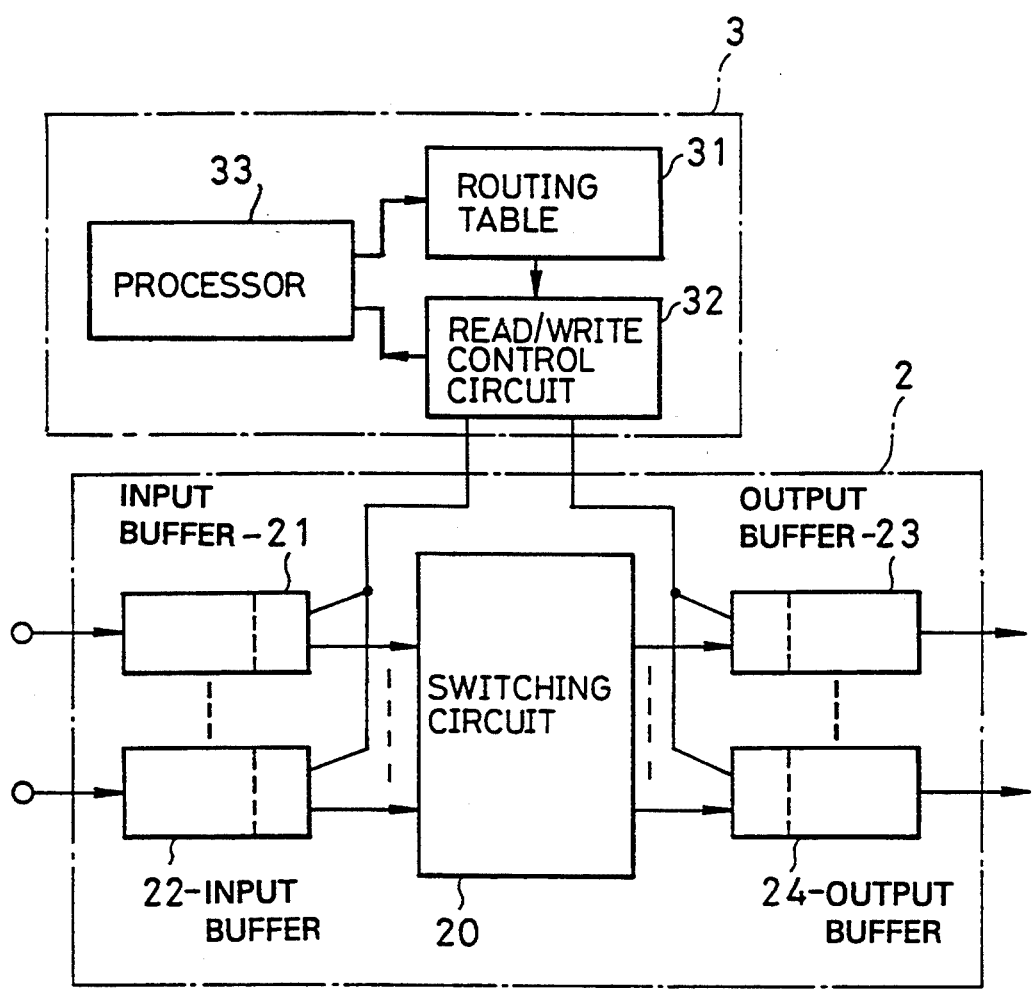
FIG. 6 is a block diagram showing an example of an internal structure of an ATM switch and a routing controller in FIG. 1.

Next, the internal structure and the operation of the ATM switch and the routing controller will be discussed. FIG. 6 is a block diagram showing the internal structure of the ATM switch 2 and the routing controller 3 in FIG. 1, in which the like reference numerals represent like elements.

In FIG. 6, the ATM switch 2 comprises input buffers 21 and 22 provided corresponding to respective input ports, output buffers 23 and 24 provided corresponding to respective output ports and a switching circuit 20 forming connection switches between respective input and output buffers. On the other hand, the routing controller 3 includes the routing table 31 for registering correspondence between the input port and the output port of the ATM switch 2, a read/write control circuit 32 for identification of the output port and assigning VCI at the output port according to the content of registration in the routing table 31, and a processor 33 for determining the output port on the basis of the IP address of the distant terminal to be called and select the vacant VCI at the output port for registering in the routing table 31.

With the construction set forth above, the input buffer stores the data from the transmitting terminal 1 per cell. Then, the read/write control circuit 32 reads out the VCI of the cell in the input buffer and performs identification of the output port and assignment of the VCI at the output port according to the content of registration in the routing table 31 (later-mentioned path ③) in FIG. 1).

When registration is not found in the routing table 31, the fact is recognized by the processor 33. Then, the processor 33 determines the output port on the basis of the IP address of the distant terminal to be called and selects one of the vacant VCI at the output port to register as the VCI (later-mentioned paths ① and ② of FIG. 1).

From the output buffer, respective cells are supplied to the receiving terminal 4 after assigning the VCI corresponding to the output port.

Discussion will now be given for variation of the content of registration in the routing table 31 when the registration is not found. FIG. 2(c) shows an example of variation of the content of registration.

In the left side of routing table 31 in FIG. 2(c), there are registrations indicating the facts that "PN1" and VCI "4" of the input port (IN) correspond to "PN3" and VCI "2" of the output port (OUT); and "PN3" and VCI "1" of the input port correspond to "PN1" and VCI "6" of the output port. Here, by communication from the transmitting terminal, additional registration is made for the fact that "PN2" and VCI "2" of the input port corresponds to "PN4" and VCI "2" of the output port. This is illustrated in the right side routing table 31 in FIG. 2(c).

Figures 4A, 4B:
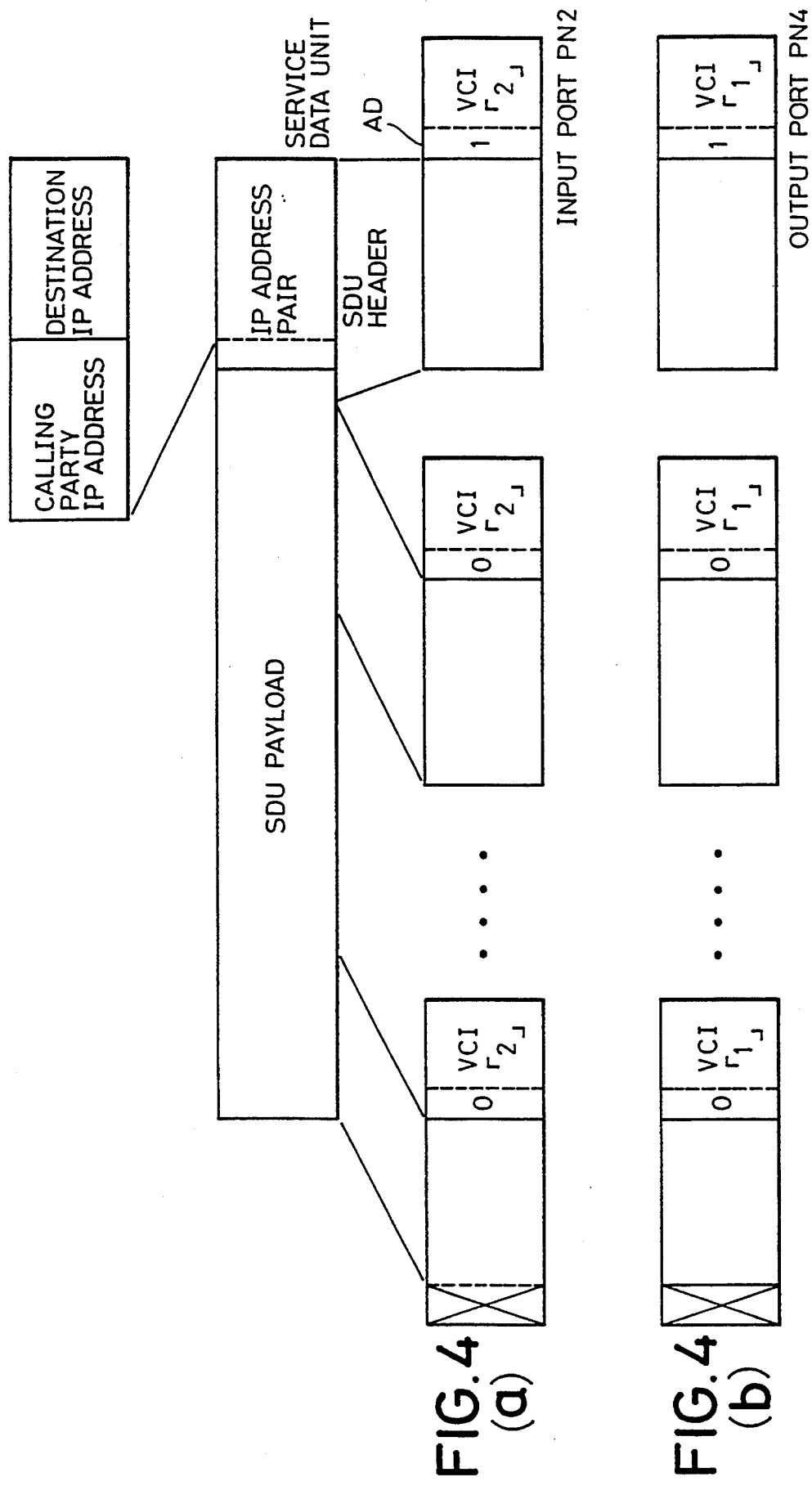
FIGS. 4a and 4b is a conceptual illustration showing an example of transfer of ATM cell of a service data unit in the ATM communication system of FIG. 1.

As set forth, the transmitting terminal 1 is provided with the function of dividing the data to be transmitted, i.e. a packet frame or service data unit (SDU) into one or more ATM cells. FIG. 4 diagrammatically shows the manner of dividing of the data and assembling the cells to be performed by the transmitting terminal 1. Namely, in FIG. 4, assuming that the original service data unit consists of an SDU header (header portion) and an SDU payload (information portion), the transmitting terminal 1 performs a process of dividing the service data unit into a plurality of cells and adds the distant user address, such as the IP address of the distant user, to the headers of the cells, as shown in FIG. 4(a). Then, among a plurality of ATM cells, a process is performed for setting (AD=1) the identification bit AD for the cell containing the IP address.

Figure 3A:
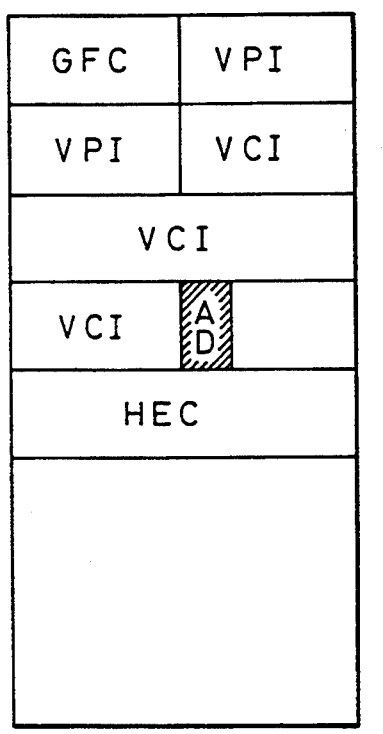
FIGS. 3(a) and 3(b) comprise an illustration showing a format of an ATM cell to be employed in the preferred embodiment of the ATM communication system of the invention.
Figure 3B:
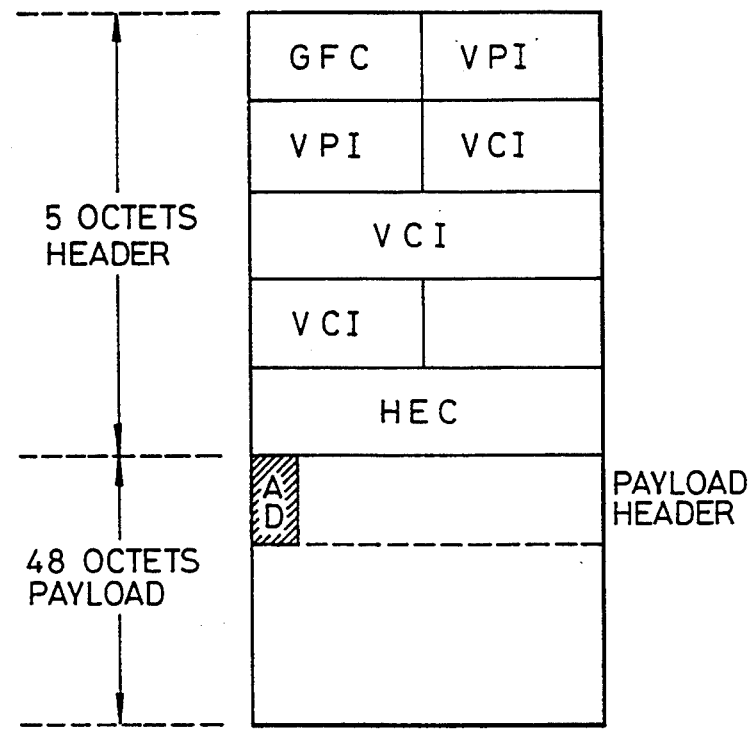

Here, as shown by the hatched area in FIG. 3, the identification AD may be defined in 5 octets of cell header in the cell format (FIG. 3(a)), or, in the alternative, may be defined in the payload header in the 48 octets cell (FIG. 3(b)). For the cells not including the IP address, the identification bit AD will not be set (AD=0).

It should be noted that, in FIGS. 3(a) and 3(b), GFC represents a general flow control, VPI represents a virtual path ID, the VCI represents the virtual connection ID, HEC represents a header error control.

Returning to FIG. 4, each cell assigned VCI "2" (FIG. 4(a)) is input to the input port PN2 of the ATM switch 2. In the ATM switch 2, the header portion is re-written and output to the output port PN4 as the cell assigned VCI "1" as shown in FIG. 4(b). The cells thus output to the output port PN4 is transmitted to the receiving terminal 4.

It should be appreciated that the SDU header of the service data unit contains the IP address consisted of a calling party IP address indicative of the transmitting terminal and a destination IP address indicative of the receiving terminal. Routing are determined on the basis of these addresses.

Returning to FIG. 1, in the communication system constructed as set forth above, the transmitting terminal 1 initially searches the vacant VCI table 11 to obtain the vacant VCI=2 at the occurrence of SDU for which the VC is not set. Then, the pair of the VCI "2" and the IP address "123" of the receiving terminal 4 are written in the VCI-IP address table 12. Second and subsequent cells are also assembled as VCI=2 as shown in FIG. 4(a). However, since the second and subsequent cells do not contain the IP address information, the identification bit AD thereof are set to zero.

At the input port PN2 of the ATM switch 2, since the route for the VCI=2 is not yet set, the non-routed cells are connected to the routing controller 3 (① of FIG. 1). The routing controller 3 then checks the destination IP address to select the output port PN4 and assigns the vacant VCI=1 (② of FIG. 1). Subsequently, by the routing table 31, for the VCI=2 of the input port PN2, the VCI=1 of the output port PN4 is assigned. Therefore, the cell arrives at the receiver terminal 4 as cell of VCI=1. The second and subsequent cells are directly transferred from the input port PN2 to the output port PN4 without passing through the routing controller 3 since the path has already been set in the routing table 31 (③ of FIG. 1).

The receiving terminal 4 registers the VC=1 as new VC in its own VCI-IP address table. It should be appreciated that the IP address information is set as the SDU header with not only the destination IP address, i.e. the IP address "123" of the receiving terminal 4 but also the address "210" indicating the transmitting terminal 1. Therefore, as shown in FIG. 2(b), the VCI-IP address table 41 in the receiving terminal 4 is consists of the correspondence of the IP address of the transmitting terminal 1 and the VCI. The VCI-IP address table may be expanded to include correspondence between the VCI, the IP address of the calling party and the destination IP address, Also, the routing table 31 in the routing controller 3, not only the correspondence between the PN numbers of the input and output ports and the VCI, the calling party IP address and the destination IP address may be stored.

When the set VC is maintained without elimination, the leading cell of the service data unit having AD=1 can pass the path illustrated by ③ of FIG. 1.

In the foregoing description, when the VC is not set, only cell of AD=1 passes the path of ①→② of FIG. 1 and other cells pass the path ③. However, it is possible to perform the process per a variable length service data unit as shown in FIG. 4 for updating the routing table when the VC is not set. Namely, at the input port PN2, when the cell, for which the VC is not yet set, arrives, the cells are supplied to the routing controller 3 irrespective of whether AD=1 or not. Then, an ATM adaptation process is performed by the routing controller 3 to restore the variable length service data unit, to determine the route and to assign the VCI on the basis of the IP address information contained in the header of the service data unit. In this case, all cells forming the first service data unit pass the path of ①→② of FIG. 1.

Figure 7:
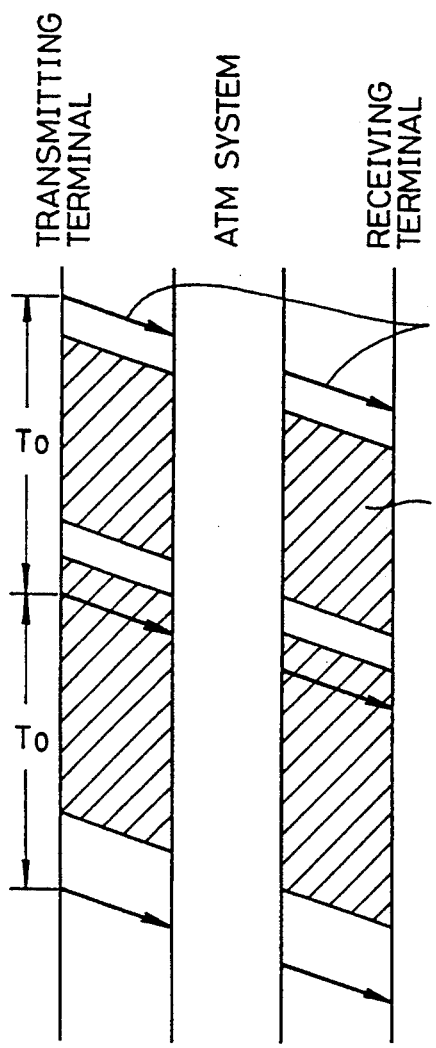
FIGS. 7(a)~7(c) are conceptual illustrations showing another registration method of the IP address.
Figure 7:
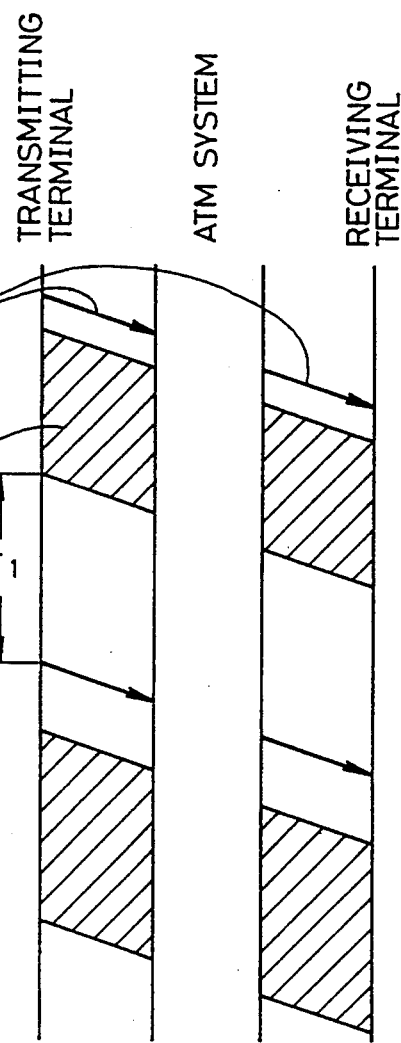
Figure 7:
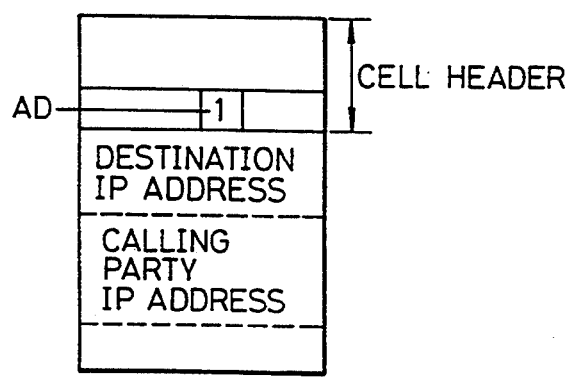
Figure 8:
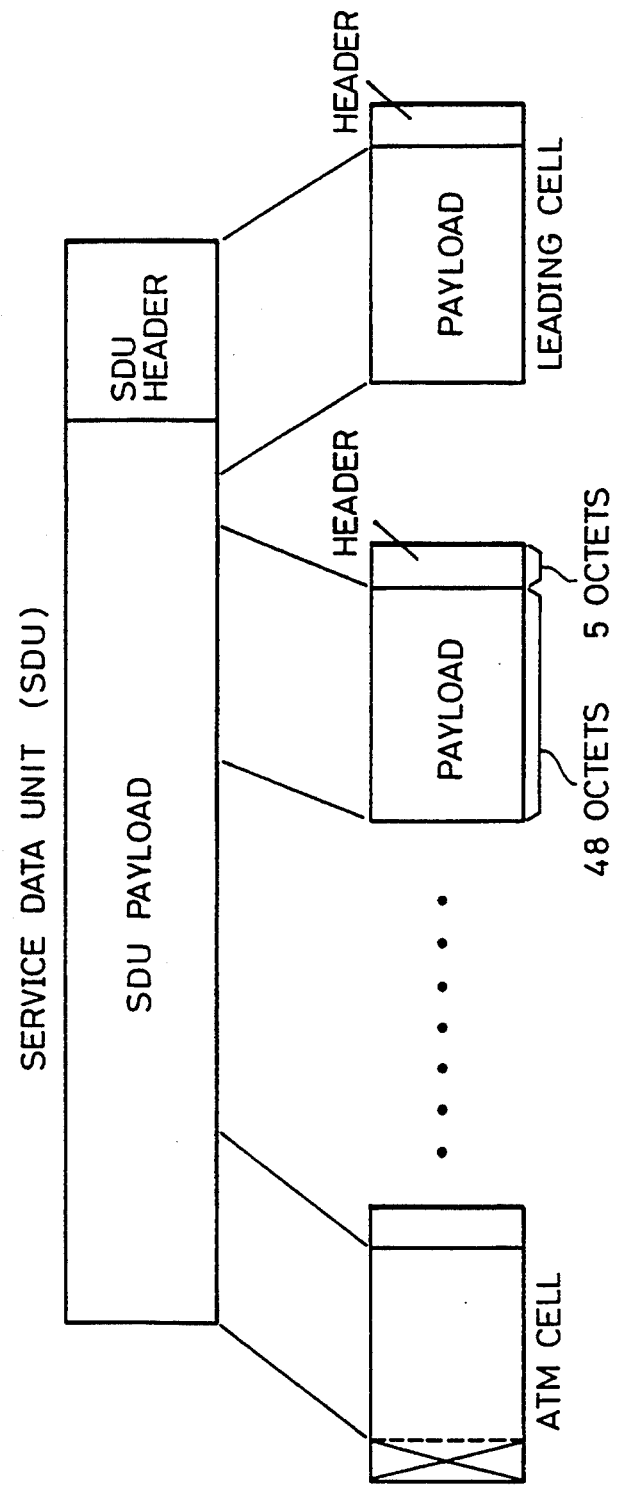
FIG. 8 is a conceptual illustration showing a typical transfer method for the service data unit employing the ATM cell.

It should be appreciated that although the foregoing embodiment performs setting of VC upon transfer of the service data unit, it is possible to define the IP address transferring cell independently of transfer of the service data unit. This method is illustrated in FIG. 7.

Namely, as shown in FIG. 7(c), by setting "1" for the identification bit AD of the cell header portion, the IP address transferring cell is identified. Then, independently of data transfer, IP address pair (destination IP address and calling party IP address) is transferred for setting the VC.

Here, in order to transfer the IP address pair independently of the data transfer, transmitting timing becomes important. As shown in FIG. 7(a), the IP address pair may be transmitted at every given interval $T_0$. Alternatively, as shown in FIG. 7(b), the IP address pair may be transmitted when a period where no data is transmitted, exceeds a given period $T_1$. It should be noted that, in FIGS. 7(a) and 7(b), arrows represent IP address pair transferring cells and hatched portions represent normal data transferring periods on the normal cell base.

In addition, various methods may be employed in canceling the set VCI or for restoring the past set VCI. Namely, the VCI may be canceled per service data unit when absence of cell transmission is maintained for a predetermined period of time. On the other hand, the VCI may be restored by means of a special cell or so forth.

The address information should not be specified to the IP address, but can be known ISDN address, MAC (media access control) address, or any other address information which can specify the terminal or host.

As set forth above, according to the present invention, without employing the outband signaling, switching of the VC can be realized. Therefore, the ATM communication system with minimized delay period and high throughput can be realized.

Also, in contrast to PVC, since the corresponding table of the VC and the routing is not required to input upon establishing of the system, complicated operation is not required. Also, the system can be operated with minimized occurrence of error. Furthermore, the ATM communication system thus constructed has high expandability.

Although the invention has been illustrated and described with respect to an exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but should include all possible embodiments which can be encompassed within the scope of the claims and equivalents thereof.

What is claimed is:

1. A communication system performing an asynchronous transfer mode (ATM) communication employing fixed length cells, comprising:

an ATM switching circuit having a plurality of input ports and a plurality of output ports and providing a virtual connection mutually connecting an input port and an output port;

a routing control means for controlling said ATM switching circuit to form a virtual connection corresponding to a virtual connection identification and a destination address set in transmitting cells applied to the input port;

a plurality of transmitting terminals for transmitting the cells respectively coupled to said input ports;

a plurality of receiving terminals for receiving the cells from one of the transmitting terminals respectively coupled to said output ports;

each of said transmitting terminals including:

a vacant virtual connection table for storing virtual connections presently unused in said ATM switching circuit;

retrieving means for retrieving an unused virtual connection from said vacant virtual connection table in response to a transmission demand for transmitting the cells from the transmitting terminal to one of the receiving terminals;

and transmitting means for setting the retrieved virtual connection as said virtual connection identification of said transmitting cells in each transmitting cell, and setting the destination address and a calling party address for specifying the transmitting terminal in a leading cell of the transmitting cells;

wherein said routing control means comprises:

management table means, including a management table, for registering the virtual connection identification, the destination address and the calling party address set in the leading cell received at the input port in said management table;

and controlling means for switching said ATM switching circuit to form the virtual connection corresponding to the virtual connection identification and destination address set in the leading cell.

2. A communication system as set forth in claim 1, wherein second and subsequent cells except for said leading cell are directly transferred from an input port to an output port without passing through said routing control means.

3. A communication system as set forth in claim 2, wherein the receiving terminal connected to said output port receives the transmitted cells from said output port.

4. A communication system as set forth in claim 3, wherein each of said transmitting terminals further includes a table for establishing correspondence between said destination address and the virtual connection of said destination address.

5. A communication system as set forth in claim 4, wherein each of said receiving terminals further includes a table for establishing correspondence between said calling party address and the virtual connection of said calling party address.

6. A communication system as set forth in claim 2, wherein each of said transmitting terminals further includes transmitting means for transmitting only the leading cell to said routing control means at every given interval, and said management table means of said routing control means registers the virtual connection identification, the destination address and the calling party address set in said leading cell received at said every given interval.

7. A communication system as set forth in claim 2, wherein each of said transmitting terminals further includes transmitting means for transmitting only the leading cell to said routing control means when the transmitting cells are not transmitted to said ATM switching circuit within a given period.

* * * * *